United States Patent
Li et al.

(10) Patent No.: US 11,711,783 B2
(45) Date of Patent: Jul. 25, 2023

(54) METHOD FOR MONITORING PAGING MESSAGE, MOBILE TERMINAL AND SERVER

(71) Applicant: VIVO MOBILE COMMUNICATION CO., LTD., Guangdong (CN)

(72) Inventors: Wenjin Li, Chang'an Dongguan (CN); Baigang Wang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/042,802

(22) PCT Filed: Mar. 25, 2019

(86) PCT No.: PCT/CN2019/079482
§ 371 (c)(1),
(2) Date: Sep. 28, 2020

(87) PCT Pub. No.: WO2019/184858
PCT Pub. Date: Oct. 3, 2019

(65) Prior Publication Data
US 2021/0029669 A1    Jan. 28, 2021

(30) Foreign Application Priority Data

Mar. 28, 2018  (CN) .......................... 201810265306.8

(51) Int. Cl.
*H04W 68/02* (2009.01)
*H04W 64/00* (2009.01)
*H04W 68/00* (2009.01)

(52) U.S. Cl.
CPC ......... *H04W 68/02* (2013.01); *H04W 64/003* (2013.01); *H04W 68/005* (2013.01)

(58) Field of Classification Search
CPC .. H04W 64/003; H04W 68/02; H04W 68/005
(Continued)

(56) References Cited

U.S. PATENT DOCUMENTS

2001/0015963 A1    8/2001   Tuomainen et al.
2006/0262739 A1*  11/2006   Ramirez .............. H04W 88/06
                                                        370/311
(Continued)

FOREIGN PATENT DOCUMENTS

CN        1980452 A     6/2007
CN      101801072 A     8/2010
(Continued)

OTHER PUBLICATIONS

CN Office Action in Application No. 201810265306.8 dated May 15, 2019.
(Continued)

*Primary Examiner* — Joel Ajayi
(74) *Attorney, Agent, or Firm* — Maschoff Brennan

(57) ABSTRACT

An embodiment of the present disclosure provides a method for monitoring a paging message, a mobile terminal, and a server. The method for monitoring the paging message is operable by a mobile terminal and includes: detecting whether the mobile terminal is in a connected state where the mobile terminal is connected with a wireless access device accessing the Internet; when the mobile terminal is in the connected state where the mobile terminal is connected with the wireless access device, monitoring the paging message according to a first paging cycle; when otherwise, monitoring the paging message according to a second paging cycle, wherein the first paging cycle is longer than the second paging cycle, and the second paging cycle is equal to a cycle according to which a core network transmits the paging message.

12 Claims, 6 Drawing Sheets

(58) Field of Classification Search
USPC .......................................................... 455/458
See application file for complete search history.

(56) References Cited

U.S. PATENT DOCUMENTS

| | | | |
|---|---|---|---|
| 2008/0261628 A1 | 10/2008 | Proctor | |
| 2009/0122736 A1 | 5/2009 | Damnjanovic | |
| 2009/0310503 A1 | 12/2009 | Tenny et al. | |
| 2012/0014316 A1* | 1/2012 | Rahman | H04W 40/02 370/328 |
| 2012/0297223 A1 | 11/2012 | Wu et al. | |
| 2013/0095789 A1 | 4/2013 | Keevill | |
| 2014/0221023 A1* | 8/2014 | Maggenti | H04L 65/1016 455/458 |
| 2014/0378172 A1 | 12/2014 | Lim | |
| 2015/0282067 A1 | 10/2015 | Zhu et al. | |
| 2016/0094401 A1 | 3/2016 | Anwar et al. | |
| 2016/0157164 A1 | 6/2016 | Lee | |
| 2016/0192283 A1* | 6/2016 | Kwak | H04W 48/16 455/434 |
| 2017/0064625 A1* | 3/2017 | Sampath | H04W 52/0216 |
| 2021/0029669 A1 | 1/2021 | Li et al. | |

FOREIGN PATENT DOCUMENTS

| | | |
|---|---|---|
| CN | 101808401 A | 8/2010 |
| CN | 102057734 A | 5/2011 |
| CN | 102740459 A | 10/2012 |
| CN | 106060910 A | 10/2016 |
| CN | 106063319 A | 10/2016 |
| CN | 108541002 A | 9/2018 |
| RU | 2438256 C2 | 12/2011 |
| WO | 2009012700 A1 | 1/2009 |
| WO | 2014107527 A1 | 7/2014 |

OTHER PUBLICATIONS

CN Search Report in Search Report in Application No. 201810265306.8 dated Nov. 19, 2018.
Written Opinion and International Search Report in Application No. PCT/CN2019/079482 dated Oct. 8, 2020.
Russian Office Action dated Mar. 31, 2021 as received in application No. 2020134646/07.
European Search Report dated Apr. 23, 2021 as received in U.S. Appl. No. 19/775,262.
Russian Search Report dated Mar. 30, 2021 as received in application No. 2020134646/07.

* cited by examiner

METHOD FOR MONITORING PAGING MESSAGE, MOBILE TERMINAL AND SERVER

CROSS-REFERENCE TO RELATED APPLICATIONS

The present application is the U.S. national phase of PCT Application No. PCT/CN2019/079482 filed on Mar. 25, 2019, which claims a priority to Chinese Patent Application No. 201810265306.8 filed in China on Mar. 28, 2018, the disclosure of which is incorporated herein by reference in its entirety.

TECHNICAL FIELD

The present disclosure relates to the field of communication technologies, and in particular to a method for monitoring a paging message, a mobile terminal and a server.

BACKGROUND

Based on a measurement result of power consumption of a 4G mobile terminal in an existing network in the related art, it is found that the mobile terminal needs to monitor a paging message once every 1024 milliseconds (a paging cycle specified in a mobile communication standard) in an idle state. Each time the paging message is being monitored, operation period of a baseband chip is about 28 ms, average current is about 100 mA, and standby current is only about 1 mA. When the mobile terminal receives the paging message, the mobile terminal determines whether a mobile terminal being paged is the mobile terminal itself, when not, it discards the paging message and continues to sleep. However, in fact, the number of times that a user is actually paged in a day is very small, and most of the paging messages being monitored are invalid, which occupies much of the standby power consumption, and adversely affects battery life of a mobile terminal with respect to especially a fifth Generation (5G) mobile terminal of higher power consumption.

BRIEF DESCRIPTION OF THE DRAWINGS

In order to illustrate the technical solutions of the embodiments of the present disclosure in a clearer manner, the drawings desired for the present disclosure will be described hereinafter briefly.

DETAILED DESCRIPTION

Figure 1:
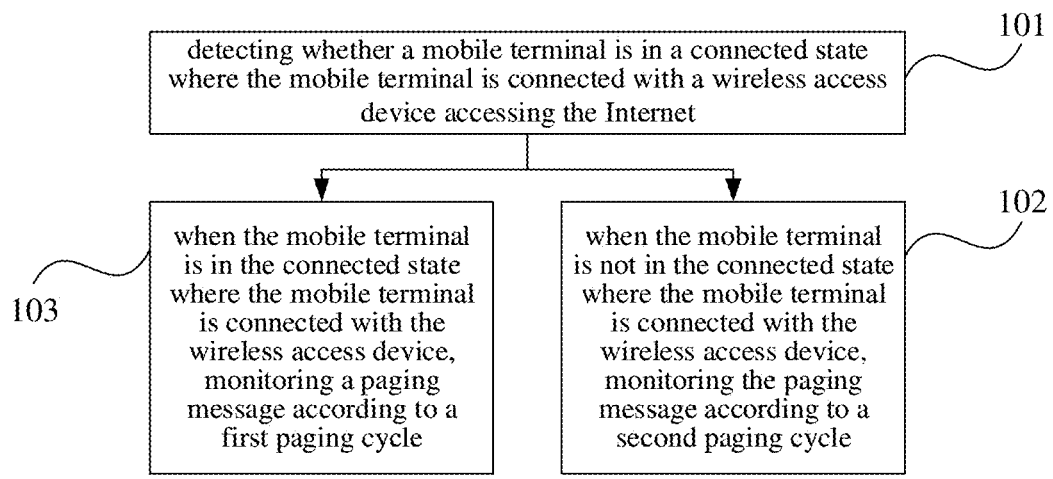
FIG. 1 shows a flowchart of a method operably by a mobile terminal for monitoring a paging message provided by an embodiment of the present disclosure.

Technical solutions in the embodiments of the present disclosure will be clearly and completely described below in combination with the accompanying drawings in the embodiments of the present disclosure. Obviously, the following embodiments merely relate to a part of, rather than all of, the embodiments of the present disclosure, and based on these embodiments, one of skill may, without any creative effort, obtain the other embodiments, which also fall within the scope of the present disclosure.

The embodiments of the present disclosure provide a method for monitoring a paging message, a mobile terminal, and a server, so as to solve a problem that more power consumption is generated by the mobile terminal due to the fact of monitoring the paging message in the related art.

In order to solve the above technical problem, the present disclosure may be implemented as follows.

In a first aspect, a method, operable by a mobile terminal, for monitoring a paging message is provided. The method includes: detecting whether the mobile terminal is in a connected state where the mobile terminal is connected with a wireless access device accessing the Internet; when the mobile terminal is in the connected state where the mobile terminal is connected with the wireless access device, monitoring the paging message according to a first paging cycle; when the mobile terminal is not in the connected state where the mobile terminal is connected with the wireless access device, monitoring the paging message according to a second paging cycle, wherein the first paging cycle is longer than the second paging cycle, and the second paging cycle is equal to a cycle according to which a core network transmits the paging message.

In a second aspect, a method, operably by a core network, for monitoring a paging message is provided. The method includes: receiving identity information of a mobile terminal reported by the mobile terminal, and location information of a wireless access device in a connected state where the wireless access device is connected with the mobile terminal, wherein the wireless access device has access to the Internet; transmitting a first message to the mobile terminal according to the identity information of the mobile terminal and the location information of the wireless access device, wherein the first message includes information about a first paging cycle according to which the paging message is monitored when the mobile terminal is in the connected state where the mobile terminal is connected with the wireless access device, wherein the first paging cycle is longer than the second paging cycle, and the second paging cycle is equal to a cycle according to which the core network transmits the paging message.

In a third aspect, a mobile terminal is provided, including: a detection module, used to detect whether the mobile terminal is in a connected state where the mobile terminal is connected with a wireless access device accessing the Internet; a first processing module, used to monitor a paging message according to a first paging cycle when the mobile terminal is in the connected state where the mobile terminal is connected with the wireless access device; a second processing module, used to monitor the paging message according to a second paging cycle when the mobile terminal is not in the connected state where the mobile terminal is connected with the wireless access device, wherein the first paging cycle is longer than the second paging cycle, and the second paging cycle is equal to a cycle according to which a core network transmits the paging message.

In a fourth aspect, a server, operable in a core network, is provided. The server includes: a third receiving module, used to receive identity information of a mobile terminal reported by the mobile terminal, and location information of a wireless access device in a connected state where the wireless access device is connected with the mobile terminal, wherein the wireless access device has access to the Internet; a third transmitting module, used to transmit a first message to the mobile terminal according to the identity information of the mobile terminal and the location information of the wireless access device, wherein the first message includes information about a first paging cycle according to which a paging message is monitored when the mobile terminal is in the connected state where the mobile terminal is connected with the wireless access device, wherein the first paging cycle is longer than the second paging cycle, and the second paging cycle is equal to a cycle according to which the core network transmits the paging message.

In a fifth aspect, a mobile terminal is provided, including a processor, a memory, and a computer program stored in the memory and capable of being executed by the processor, wherein the processor is used to execute the computer program to implement the steps of the method operable by the mobile terminal for monitoring a paging message as described above.

In a sixth aspect, a server is provided, including a processor, a memory, and a computer program stored in the memory and capable of being executed by the processor, wherein the processor is used to execute the computer program to implement the steps of the method operable by the core network for monitoring a paging message as described above.

In the embodiments of the present disclosure, a new paging protocol is defined in a mobile communication system. When the mobile terminal is in a connected state where the mobile terminal is connected with the wireless access device that has access to the Internet, a paging cycle according to which the mobile terminal monitors a paging message can be modified, so that the paging cycle of monitoring the paging message can be extended, so as to save power consumption and extend battery life of the mobile terminal.

According to an aspect of the embodiments of the present disclosure, a method, operable by a mobile terminal, for monitoring a paging message, is provided.

As shown in FIG. 1, a method for monitoring a paging message may include following steps.

Step 101: detecting whether the mobile terminal is in a connected state where the mobile terminal is connected with a wireless access device accessing the Internet.

In embodiments of the present disclosure, before the mobile terminal monitors a paging message, it first determines whether it is in the connected state where the mobile terminal is connected with the wireless access device. At same time, in order to ensure network connectivity, it is also necessary to determine whether the wireless access device is connected with the Internet.

The wireless access device described herein includes but is not limited to: a wireless router, a wireless access point (Wireless Access Point, AP), or another device that enables the mobile terminal to access the Internet through a wireless local area network (Wireless Local Area Network, WLAN). The mobile terminal can access the wireless access device through a WLAN module or a satellite communication module arranged therein.

Step 102: when the mobile terminal is in the connected state where the mobile terminal is connected with the wireless access device, monitoring a paging message according to a first paging cycle.

In embodiments of the present disclosure, when it is detected that the mobile terminal is in the connected state where the mobile terminal is connected with the wireless access device, and the wireless access device has access to the Internet, a paging message is monitored according to the first paging cycle. The first paging cycle is longer than a cycle according to which a core network transmits the paging message, and the cycle according to which the core network transmits the paging message is a paging cycle specified in a mobile communication standard.

Figure 2:
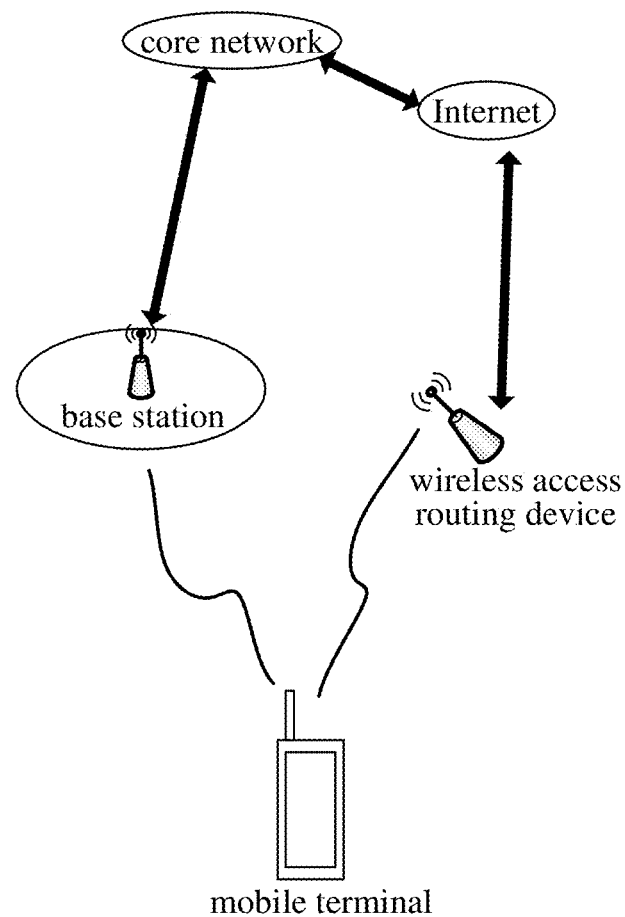
FIG. 2 shows a schematic diagram of a network system provided by an embodiment of the present disclosure.

As shown in FIG. 2, a core network accesses the Internet. When the mobile terminal monitors a paging message according to the first paging cycle, the core network transmits the paging message to the mobile terminal through the wireless access device.

Since the core network transmits a paging message to the mobile terminal through the Internet, in this case, a paging cycle according to which the mobile terminal monitors the paging message can be modified. In embodiments of the present disclosure, by extending the paging cycle according to which the mobile terminal monitors the paging message, the number of times of monitoring in same period is reduced, thereby achieving a purpose of reducing power consumption of monitoring the paging message. For example, the paging cycle specified in the mobile communication standard is 1024 ms, while the first paging cycle in embodiments of the present disclosure may be 3072 ms, so that in same period, the number of times the mobile terminal being awakened is reduced to one third of the original number of times the mobile terminal being awakened, and the total power consumption is also reduced to one third of original total power consumption, thereby achieving a purpose of saving power consumption. One of skill would appreciate that the multiple need not be restricted to three.

Step 103: when the mobile terminal is not in the connected state where the mobile terminal is connected with the wireless access device, monitoring a paging message according to a second paging cycle.

In embodiments of the present disclosure, when it is detected that the mobile terminal is not connected with the wireless access device, a paging message is monitored according to the second paging cycle. At this time, the core network transmits the paging message to the mobile terminal through a base station, as shown in FIG. 2.

The second paging cycle is equal to the cycle according to which the core network transmits a paging message, that is, when the mobile terminal is not in the connected state where the mobile terminal is connected with the wireless access device, the mobile terminal monitors the paging message according to the paging cycle specified in the mobile communication standard.

In the above technical solution, a new paging protocol is defined in a mobile communication system. When the mobile terminal is in the connected state where the mobile terminal is connected with the wireless access device that has access to the Internet, the paging cycle according to which the mobile terminal monitors a paging message can be modified, so that the paging cycle of the mobile terminal can be extended, thereby reducing the number of times of waking up related circuit in the mobile terminal to monitor the paging message in same period, so as to save power consumption and extend battery life of the mobile terminal.

Further, after detecting that the mobile terminal has been in the connected state where the mobile terminal is connected with the wireless access device, and before monitoring a paging message according to the first paging cycle, the mobile terminal may also acquire its own identity information and location information of the wireless access device connected with the mobile terminal (that is, physical information corresponding to an address of the wireless access device), and report its own identity information and the location information of the wireless access device to the core network, so that the core network can determine the mobile terminal and the wireless access device connected with the mobile terminal according to this information.

The identity information described herein includes but is not limited to: a media access control (Media Access Control, MAC) address of the mobile terminal, an Internet Protocol (IP) address assigned to the mobile terminal by the wireless access device, an international mobile equipment identity (International Mobile Equipment Identity, IMEI) code of the mobile terminal and a temporary mobile subscriber identity (Temporary Mobile Subscriber Identity, TMSI) code of the mobile terminal.

In an embodiment, the mobile terminal can transmit its identity information and the location information of the wireless access device connected with the mobile terminal to the core network through the wireless access device, or transmit them through a mobile communication network. A specific implementation of transmitting the identity information of the mobile terminal and the location information of the wireless access device connected with the mobile terminal can be determined according to actual needs.

In an embodiment, after the mobile terminal reports its own identity information and the location information of the wireless access device connected with the mobile terminal to the core network, the core network transmits a first message to the mobile terminal. The first message includes information about the first paging cycle according to which a paging message is monitored when the mobile terminal is in the connected state where the mobile terminal is connected with the wireless access device. After receiving the first message, the mobile terminal monitors the paging message according to the first paging cycle.

In embodiments of the present disclosure, when the mobile terminal is in the connected state where the mobile terminal is connected with the wireless access device that has access to the Internet, the core network transmits a paging message to the mobile terminal through the Internet, and the mobile terminal accesses the paging message through the Internet. After the mobile terminal receives the paging message transmitted by the core network through the wireless access device, when the mobile terminal determines that the mobile terminal itself is the mobile terminal being paged, the mobile terminal responds to the paging through the mobile communication network.

Further, when it is detected that the mobile terminal is disconnected from the wireless access device, a second message is transmitted to the core network, wherein the second message includes information that the mobile terminal is in a disconnected state where the mobile terminal is disconnected from the wireless access device, so that the core network no longer transmits a paging message to the mobile terminal through the wireless access device.

In order to further understand a method provided by embodiments of the present disclosure, a 5G network is taken as an example below for further explanation.

Figure 3:
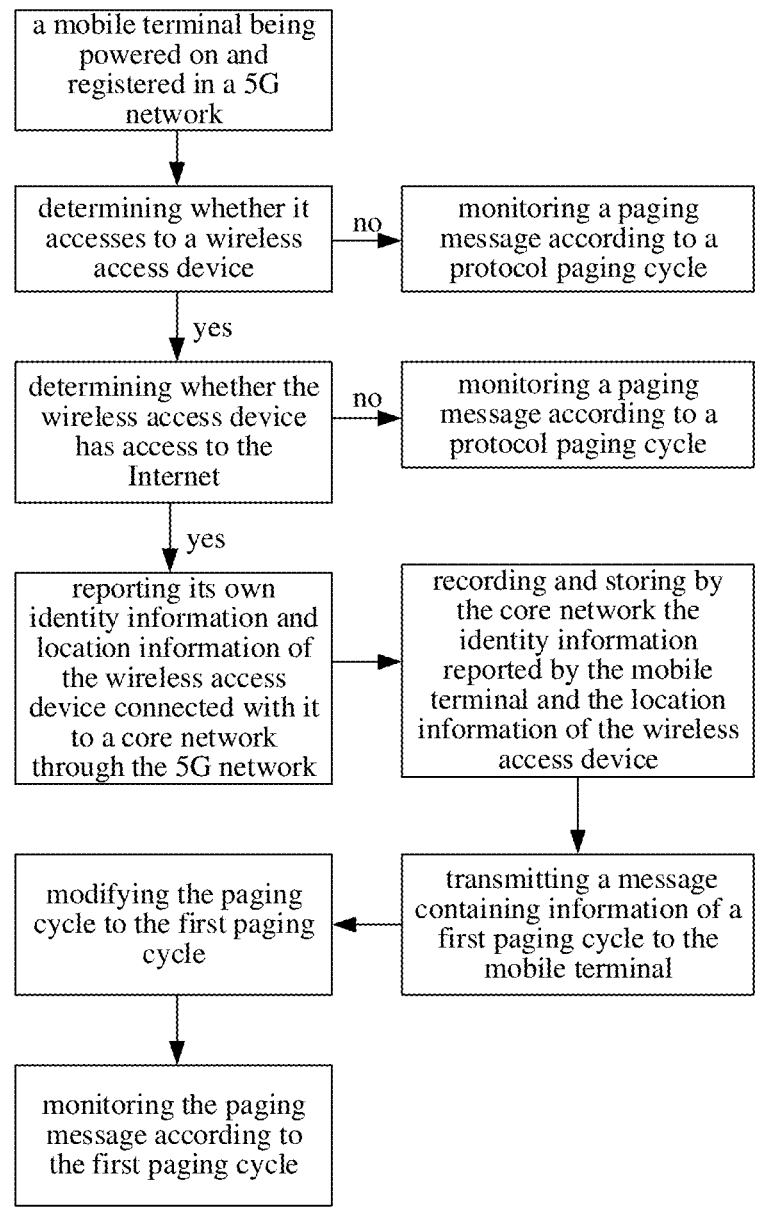
FIG. 3 shows a flowchart of an example provided by an embodiment of the present disclosure.

As shown in FIG. 3, after a mobile terminal is powered on and registered in the 5G network, it determines whether it accesses to a wireless access device. When the mobile terminal does not access the wireless access device, a paging message is monitored according to a paging cycle specified in the mobile communication standard (hereinafter referred to as a protocol paging cycle). When the mobile terminal has access to the wireless access device, it is determined whether the wireless access device has access to the Internet; when the wireless access device does not access to the Internet, the paging message is monitored according to the protocol paging cycle; and when the wireless access device has access to the Internet, the mobile terminal reports its own identity information and the location information of the wireless access device connected with the mobile terminal to a core network through the 5G network. The core network records and stores the identity information reported by the mobile terminal and the location information of the wireless access device, and transmits a message containing information of a first paging cycle to the mobile terminal. After receiving the message, the mobile terminal modifies the paging cycle to the first paging cycle, and monitors the paging message according to the first paging cycle, and the first paging cycle is longer than the paging cycle specified in the mobile communication standard. In this way, the paging cycle according to which the mobile terminal monitors the paging message is extended, the number of monitoring processes in same period is reduced, a purpose of reducing power consumption and saving power is achieved, and battery life of the mobile terminal is extended.

Finally, it should be noted that in embodiments of the present disclosure, when the mobile terminal is in the connected state where the mobile terminal is connected with the wireless access device that has access to the Internet, in addition to the core network transmitting a paging message through the Internet and the mobile terminal receiving the paging message through the Internet, interaction of other information between the core network and the mobile terminal can be transmitted through the Internet or through the mobile communication network. Specific situations can be selected according to actual needs, which are not limited in the embodiments of the present disclosure.

A method for monitoring a paging message provided by embodiments of the present disclosure defines a new paging protocol in a mobile communication system. When a mobile terminal is in a connected state where the mobile terminal is connected with a wireless access device that has access to the Internet, a core network transmits the paging message through the Internet, and the mobile terminal receives the paging message through the Internet. In this way, a paging cycle according to which the mobile terminal monitors the paging message can be modified, so that the paging cycle of the mobile terminal can be extended, thereby reducing the number of times of waking up the related circuit in the mobile terminal to monitor the paging message in the same period, so as to save power consumption and extend battery life of the mobile terminal.

According to another aspect of the embodiments of the present disclosure, a method, operable in a core network, for monitoring a paging message, is provided, which is suitable for the 5G network and precursor networks before the 5G network (e.g., 2G, 3G, or 4G networks).

Figure 4:
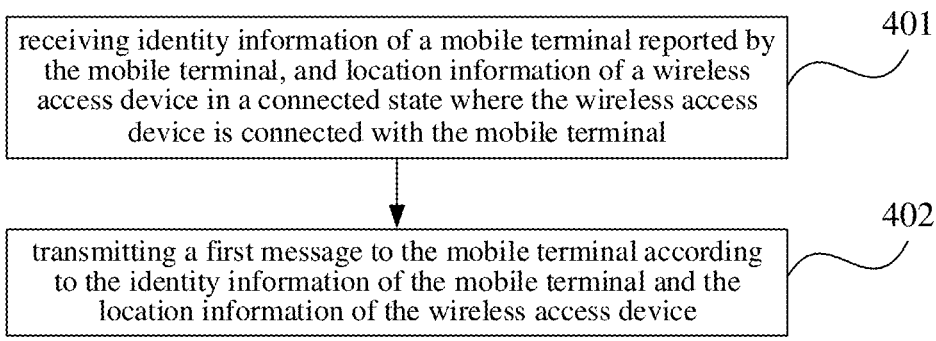
FIG. 4 shows a flowchart of a method operably by a core network for monitoring a paging message provided by an embodiment of the present disclosure.

As shown in FIG. 4, in an embodiment, a method for monitoring a paging message includes:

Step 401: receiving identity information of a mobile terminal reported by the mobile terminal, and location information of a wireless access device in a connected state where the wireless access device is connected with the mobile terminal.

The wireless access device has access to the Internet. The wireless access device described here may include but is not limited to: a wireless router, a wireless access point, or another device that enables the mobile terminal to access the Internet through WLAN. The mobile terminal can access the wireless access device through a WLAN module or a satellite communication module arranged therein. The core network is connected with the wireless access device through the Internet.

In embodiments of the present disclosure, when the mobile terminal detects that the mobile terminal itself is in the connected state where the mobile terminal is connected with the wireless access device accessing the Internet, it will acquire its own identity information and the location information of the wireless access device connected with the mobile terminal, and report its own identity information and the location information of the wireless access device to the core network.

The identity information described herein includes but is not limited to: a MAC address of the mobile terminal, an IP address assigned to the mobile terminal by the wireless access device, an IMEI code of the mobile terminal and a TMSI code of the mobile terminal.

Step 402: transmitting a first message to the mobile terminal according to the identity information of the mobile terminal and the location information of the wireless access device.

After receiving the identity information of the mobile terminal reported by the mobile terminal and the location information of the wireless access device connected with the mobile terminal, the core network determines the wireless access device and the mobile terminal according to the above information, and transmits the first message to the mobile terminal.

The first message includes information about a first paging cycle according to which a paging message is monitored when the mobile terminal is in the connected state where the mobile terminal is connected with the wireless access device.

The first paging cycle is longer than the second paging cycle, and the second paging cycle is equal to the cycle according to which the core network transmits a paging message, and the cycle according to which the core network transmits the paging message is the paging cycle specified in the mobile communication standard.

In embodiments of the present disclosure, when the mobile terminal is in the connected state where the mobile terminal is connected with the wireless access device that has access to the Internet, the paging cycle according to which the mobile terminal monitors a paging message can be modified, so that the paging cycle of the mobile terminal can be extended, thereby reducing the number of times of waking up the related circuit in the mobile terminal to monitor the paging message in the same period, so as to save power consumption and extend battery life of the mobile terminal.

Further, in embodiments of the present disclosure, when the mobile terminal is in the connected state where the mobile terminal is connected with the wireless access device that has access to the Internet, the core network transmits a paging message to the mobile terminal through the Internet, and the mobile terminal accesses the paging message through the Internet. When the core network receives the paging message for the mobile terminal, it will transmit the paging message to the mobile terminal through the wireless access device (that is, through the Internet).

In an embodiment, in order to enable the core network to know that the mobile terminal is in the connected state where the mobile terminal is connected with the wireless access device that has access to the Internet, either of at least the following two modes can be adopted.

Mode 1: upon receiving the identity information of the mobile terminal reported by the mobile terminal and the location information of the wireless access device, it is considered by default that the mobile terminal is in the connected state where the mobile terminal is connected with the wireless access device that has access to the Internet.

Mode 2: the mobile terminal reports to the core network the state information that the mobile terminal is in the connected state where the mobile terminal is connected with the wireless access device that has access to the Internet.

Naturally, after the mobile terminal is disconnected from the wireless access device, it may also transmit a second message to the core network. The second message may include information that the mobile terminal is in a disconnected state where the mobile terminal is disconnected from the wireless access device, so that the core network no longer transmits a paging message to the mobile terminal through the wireless access device. After receiving the second message, the core network confirms that the mobile terminal is not in the connected state where the mobile terminal is connected with the wireless access device accessing the Internet, and then transmits the paging message to the mobile terminal through the base station (that is, through the mobile communication network).

In order to further facilitate to understand a process of transmitting a paging message by the core network in embodiments of the present disclosure, the 5G network is taken as an example below for further explanation.

Figure 5:
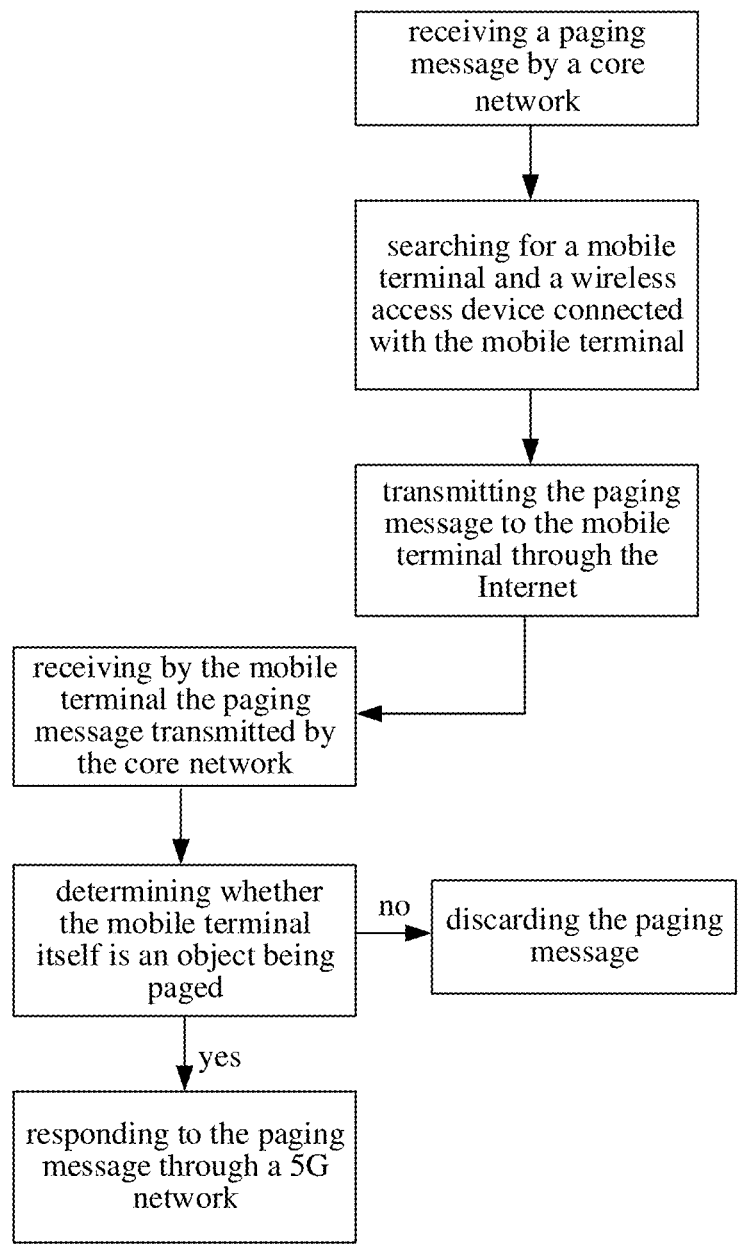
FIG. 5 shows a flowchart of an example provided by an embodiment of the present disclosure.

As shown in FIG. 5, in an embodiment, after receiving a paging message, a core network searches for a mobile terminal and a wireless access device connected with the mobile terminal, and transmits a paging message to the mobile terminal through the Internet. When the mobile terminal receives the paging message, the mobile terminal determines whether the mobile terminal itself is an object being paged, and when the mobile terminal itself is the object being paged, the mobile terminal will respond to the paging message through the 5G network; and when the mobile terminal itself is not the object being paged, it will discard the paging message and continue to sleep.

It should be noted that, in embodiments of the present disclosure, a cycle according to which the core network transmits a paging message remains unchanged, and the paging message is still transmitted according to the cycle specified in the mobile communication standard, and only the paging cycle of the mobile terminal will change.

In addition, when the mobile terminal is in the connected state where the mobile terminal is connected with the wireless access device that has access to the Internet, in addition to the core network transmitting a paging message through the Internet and the mobile terminal receiving the paging message through the Internet, interaction of other information between the core network and the mobile terminal can be transmitted through the Internet or through the mobile communication network. Specific situations can be selected according to actual needs, which are not limited in the embodiments of the present disclosure.

A method for monitoring a paging message provided by embodiments of the present disclosure defines a new paging protocol in a mobile communication system. When a mobile terminal is in a connected state where the mobile terminal is connected with the wireless access device that has access to the Internet, a core network transmits the paging message through the Internet, and the mobile terminal receives the paging message through the Internet. In this way, the paging cycle according to which the mobile terminal monitors the paging message can be modified, so that the paging cycle of the mobile terminal can be extended, thereby reducing the number of times of waking up the related circuit in the mobile terminal to monitor the paging message in the same period, so as to save power consumption and extend battery life of the mobile terminal.

According to another aspect of embodiments of the present disclosure, a mobile terminal is provided.

Figure 6:
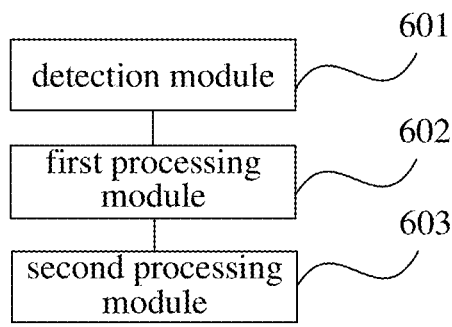
FIG. 6 shows a first block diagram of a mobile terminal provided by an embodiment of the present disclosure.

As shown in FIG. 6, in an embodiment, a mobile terminal includes: a detection module 601, used to detect whether the mobile terminal is in a connected state where the mobile terminal is connected with a wireless access device accessing the Internet; a first processing module 602, used to monitor a paging message according to a first paging cycle when the mobile terminal is in the connected state where the mobile terminal is connected with the wireless access device; a second processing module 603, used to monitor the paging message according to a second paging cycle when the mobile terminal is not in the connected state where the mobile terminal is connected with the wireless access device, wherein the first paging cycle is longer than the second paging cycle, and the second paging cycle is equal to a cycle according to which a core network transmits the paging message, and the cycle according to which the core network transmits the paging message is the paging cycle specified in a mobile communication standard.

Figure 7:
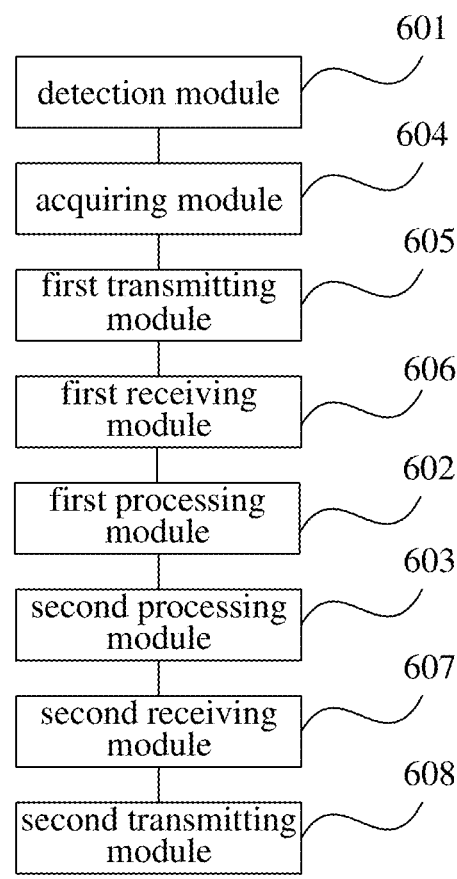
FIG. 7 shows a second block diagram of a mobile terminal provided by an embodiment of the present disclosure.

Further, as shown in FIG. 7, in an embodiment, a mobile terminal further includes: an acquiring module 604, used to acquire identity information of the mobile terminal and location information of the wireless access device; and a first transmitting module 605, used to report the identity information of the mobile terminal and the location information of the wireless access device to the core network.

The identity information described herein includes but is not limited to: a MAC address of the mobile terminal, an IP address assigned to the mobile terminal by the wireless access device, an IMEI code of the mobile terminal and a TMSI code of the mobile terminal.

Further, in an embodiment as shown in FIG. 7, the mobile terminal further includes: a first receiving module 606, used to receive a first message transmitted by the core network, wherein the first message includes information about the first paging cycle according to which a paging message is monitored when the mobile terminal is in the connected state where the mobile terminal is connected with the wireless access device.

Further, in an embodiment as shown in FIG. 7, the mobile terminal further includes: a second receiving module 607, used to receive a paging message transmitted by the core network through the wireless access device.

Further, in an embodiment as shown in FIG. 7, the mobile terminal further includes: a second transmitting module 608, used to transmit a second message to the core network when it is detected that the mobile terminal is disconnected from the wireless access device, wherein the second message includes information that the mobile terminal is in a disconnected state where the mobile terminal is disconnected from the wireless access device.

In a mobile terminal provided by embodiments of the present disclosure, the detection module 601 detects whether the mobile terminal is in the connected state where the mobile terminal is connected with the wireless access device accessing the Internet. When the detection module 601 detects that the mobile terminal is in the connected state where the mobile terminal is connected with the wireless access device, the first processing module 602 controls the mobile terminal to monitor a paging message according to the first paging cycle. When the detection module 601 detects that the mobile terminal is not in the connected state where the mobile terminal is connected with the wireless access device, the second processing module 603 controls the mobile terminal to monitor the paging message according to the second paging cycle. The first paging cycle is longer than the second paging cycle, and the second paging cycle is equal to the cycle according to which the core network transmits the paging message, which is the paging cycle specified in the mobile communication standard. In this way, a new paging protocol is defined in a mobile communication system. When the mobile terminal is in a connected state where the mobile terminal is connected with the wireless access device that has access to the Internet, the paging cycle according to which the mobile terminal monitors the paging message can be modified, so that the paging cycle of the mobile terminal can be extended, thereby reducing the number of times of waking up the related circuit in the mobile terminal to monitor the paging message in the same period, so as to save power consumption and extend battery life of the mobile terminal.

According to another aspect of embodiments of the present disclosure, a server, operable in a core network, is provided.

Figure 8:
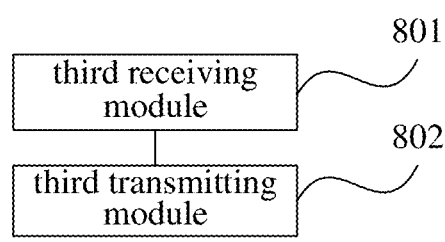
FIG. 8 shows a first block diagram of a server provided by an embodiment of the present disclosure.

In an embodiment as shown in FIG. 8, a server includes: a third receiving module 801, used to receive identity information of a mobile terminal reported by the mobile terminal, and location information of a wireless access device in a connected state where the wireless access device is connected with the mobile terminal, wherein the wireless access device has access to the Internet; a third transmitting module 802, used to transmit a first message to the mobile terminal according to the identity information of the mobile terminal and the location information of the wireless access device, wherein the first message includes information about a first paging cycle according to which a paging message is monitored when the mobile terminal is in the connected state where the mobile terminal is connected with the wireless access device, wherein the first paging cycle is longer than the second paging cycle, and the second paging cycle is equal to a cycle according to which the core network transmits the paging message, and the cycle according to which the core network transmits the paging message is the paging cycle specified in the mobile communication standard.

Figure 9:
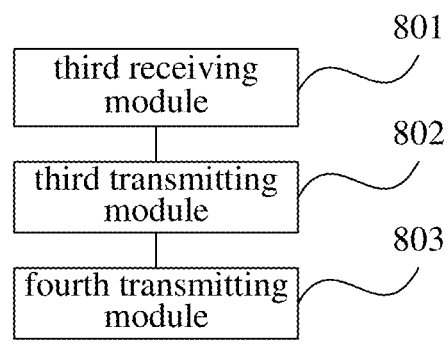
FIG. 9 shows a second block diagram of a server provided by the embodiment of the present disclosure.

In an embodiment as shown in FIG. 9, the server further includes: a fourth transmitting module 803, used to transmit a paging message to the mobile terminal through the wireless access device when the paging message is received.

When a server provided by embodiments of the present disclosure detects that a mobile terminal is in a connected state where the mobile terminal is connected with a wireless access device accessing the Internet, the third transmitting module 802 transmits a first message to the mobile terminal to negotiate with the mobile terminal, so that the mobile terminal monitors a paging message according to a first paging cycle, thereby to modify the paging cycle of the mobile terminal, extend the paging cycle, reduce the number of times of waking up the related circuit to monitor the paging message in the same period, and achieve the purpose of saving power consumption.

Figure 10:
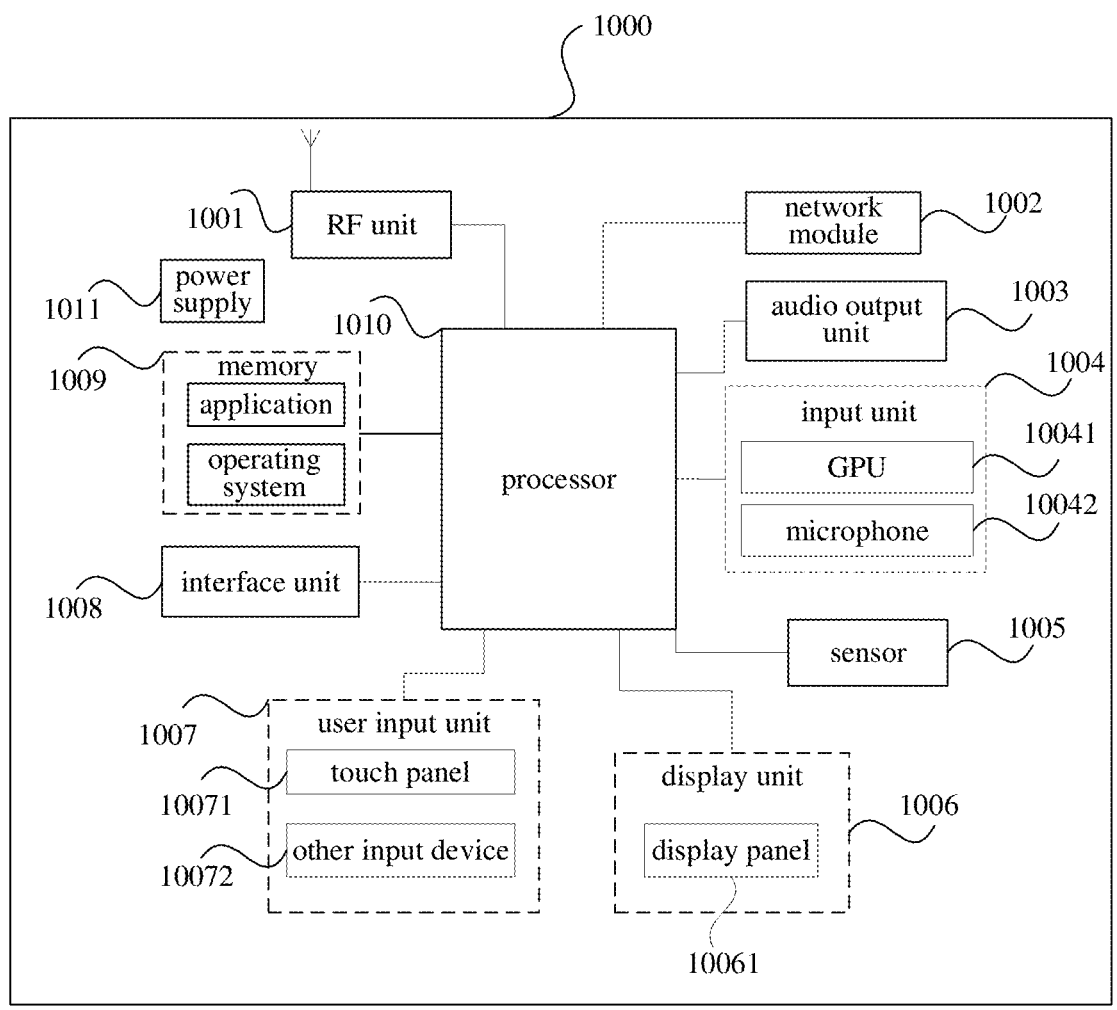
FIG. 10 shows a third block diagram of a mobile terminal provided by an embodiment of the present disclosure.

FIG. 10 is a schematic diagram of a hardware structure of an example mobile terminal for implementing various embodiments of the present disclosure.

The mobile terminal 1000 of FIG. 10 includes, but is not limited to, a Radio Frequency (RF) unit 1001, a network module 1002, an audio output unit 1003, an input unit 1004, a sensor 1005, a display unit 1006, a user input unit 1007, an interface unit 1008, a memory 1009, a processor 1010, a power supply 1011, and the like. One of skill may understand that the structure of the mobile terminal shown in FIG. 10 does not constitute a limitation on the mobile terminal, and the mobile terminal may include more or fewer components than those illustrated, or may combine certain components, or may have a different component arrangement. In embodiments of the present disclosure, the mobile terminal may be, but is not limited to being, a mobile phone, a tablet computer, a notebook computer, a palmtop computer, a vehicle-mounted terminal, a wearable device, a pedometer, and the like.

In an embodiment, the processor 1010 is used to detect whether the mobile terminal is in the connected state where the mobile terminal is connected with a wireless access device accessing the Internet; when the mobile terminal is in the connected state where the mobile terminal is connected with the wireless access device, a paging message is monitored according to a first paging cycle; otherwise, the paging message is monitored according to a second paging cycle, wherein the first paging cycle is longer than the second paging cycle, and the second paging cycle is equal to a cycle according to which a core network transmits the paging message.

In embodiments of the present disclosure, a new paging protocol is defined in a mobile communication system. When a mobile terminal is in a connected state where the mobile terminal is connected with a wireless access device that has access to the Internet, a paging cycle according to which the mobile terminal monitors a paging message can be modified, so that the paging cycle of monitoring the paging message can be extended, so as to save power consumption and extend battery life of the mobile terminal.

It should be understood that, in embodiments of the present disclosure, the RF unit 1001 can be used to receive and transmit information, or receive and transmit a signal during a call. Specifically, after receiving downlink data from a base station, the downlink data is processed by the processor 1010; in addition, uplink data is transmitted to the base station. Generally, the RF unit 1001 includes, but is not limited to, an antenna, at least one amplifier, a transceiver, a coupler, a low noise amplifier, a duplexer, and the like, as would be readily understood by those of skill. In addition, the RF unit 1001 may also communicate with the network and another communication device through a wireless communication system.

The mobile terminal may provide a user with wireless broadband Internet access through the network module 1002, such as enabling the user to send or receive an e-mail, browse a web page, access streaming media, and the like.

The audio output unit 1003 may convert audio data received by the RF unit 1001 or the network module 1002 or stored in the memory 1009 into an audio signal and output it as a sound. Moreover, the audio output unit 1003 may also provide an audio output related to a specific function performed by the mobile terminal 1000 (for example, call signal reception sound, message reception sound, or the like). The audio output unit 1003 includes a speaker, a buzzer, a receiver, and the like.

The input unit 1004 may be used to receive an audio or video signal. The input unit 1004 may include a graphics processing unit (Graphics Processing Unit, GPU) 10041 and a microphone 10042, and the GPU 10041 processes image data of a still picture or a video obtained by an image capturing device (such as a camera) in a video capturing mode or an image capturing mode. A processed image frame may be displayed on the display unit 1006. The image frame processed by the GPU 10041 may be stored in the memory 1009 (or other storage medium) or transmitted via the RF unit 1001 or the network module 1002. The microphone 10042 may receive sound and process such sound into audio data. The processed audio data may be converted into a format output that may be transmitted to a mobile communication base station via the RF unit 1001 in a case of a telephone call mode.

The mobile terminal 1000 also may include at least one type of sensor 1005, such as a light sensor, a motion sensor, and other sensors. Specifically, the light sensor includes an ambient light sensor and a proximity sensor, wherein the ambient light sensor may adjust brightness of the display panel 10061 according to brightness of ambient light, and the proximity sensor may turn off the display panel 10061 and/or backlight when the mobile terminal 1000 is near an ear. As a type of motion sensor, an accelerometer sensor may detect magnitude of acceleration in various directions (generally in three axes), and may detect magnitude and direction of gravity when the accelerometer sensor is still, and may be used to identify orientation of the mobile terminal (such as horizontal and vertical screen switching, related games, magnetometer orientation calibration), vibration identification related functions (such as pedometer, tapping), etc.; as one of skill would understand, the sensor 1005 may also include a fingerprint sensor, a pressure sensor, an iris sensor, a molecular sensor, a gyroscope, a barometer, a hygrometer, a thermometer, an infrared sensor, and the like, and details thereof will not be described herein.

The display unit 1006 may be used to display information input by the user or provided to the user. The display unit 1006 may include a display panel 10061, which may be configured in a form of a Liquid Crystal Display (LCD), an Organic Light-Emitting Diode (OLED) display, etc.

The user input unit 1007 may be used to receive numeric or character information being inputted, and generate a key signal input related to user settings and function control of the mobile terminal. Specifically, the user input unit 1007 may include a touch panel 10071 and another input device 10072. The touch panel 10071, also known as a touch screen, may collect the user's touch operation on or near it (such as the user's operation on or near the touch panel 10071 using any suitable object or accessory such as a finger of the user, a stylus, etc.). The touch panel 10071 may include a touch detection device and a touch controller. The touch detection device detects an orientation of the touch of the user, and detects a signal brought by the touch operation, and transmits the signal to the touch controller; and the touch controller receives touch information from the touch detection device and converts it into contact coordinates, then transmits the contact coordinates to the processor 1010, and receives a command transmitted by the processor 1010 and executes the command. In addition, the touch panel 10071 may be implemented in various types, such as a resistive touch panel, a capacitive touch panel, an infrared touch panel, and a surface acoustic wave touch panel. In addition to the touch panel 10071, the user input unit 1007 may also include the other input device 10072. Specifically, as would be understood by those of skill, the other input device 10072 may include, but is not limited to, a physical keyboard, a function key (such as a volume control key, a switch key, etc.), a trackball, a mouse, a joystick, and details thereof will not be described herein.

Further, the touch panel 10071 may cover the display panel 10061. When the touch panel 10071 detects the touch operation on or near it, information about the touch operation is transmitted to the processor 1010 to determine a type of a touch event, and then the processor 1010 may provide a corresponding visual output on the display panel 10061 according to the type of the touch event. Although in FIG. 10, the touch panel 10071 and the display panel 10061 as shown as two independent components to implement input and output functions of the mobile terminal, in some embodiments, the touch panel 10071 and the display panel 10061 may be integrated to implement the input and output functions of the mobile terminal, which is not specifically limited herein.

The interface unit 1008 is an interface for connecting an external device to the mobile terminal 1000. For example, the external device may include a wired or wireless headphone port, an external power (or battery charger) port, a wired or wireless data port, a memory card port, a port for connecting a device with an identification module, an audio input/output (I/O) port, a video I/O port, a headphone port, etc. The interface unit 1008 may be used to receive an input (for example, data information, electric power, etc.) from the external device, and transmit the received input to one or more elements within the mobile terminal 1000 or may be used to transmit data between the mobile terminal 1000 and the external device.

The memory 1009 can be used to store a software program and various data. The memory 1009 may mainly include a program storage region and a data storage region, wherein the program storage region may store an operating system, an application required by at least one function (such as a sound playback function, an image playback function, etc.), etc.; the data storage region may store data (such as audio data, a phone book, etc.) created according to the use of the mobile phone, etc. In addition, the memory 1009 may include a high-speed random access memory, and may also include a non-volatile memory, such as at least one disk storage device, a flash memory device, or another volatile solid-state storage device.

The processor 1010 may be a control center of the mobile terminal, which uses various interfaces and lines to connect various parts of the entire mobile terminal, runs or executes the software programs and/or modules stored in the memory 1009, and calls the data stored in the memory 1009, to execute various functions of the mobile terminal and process data, thereby monitoring the mobile terminal as a whole. The processor 1010 may include one or more processing units; optionally, the processor 1010 may integrate an application processor and a modem processor, wherein the application processor mainly processes an operating system, a user interface, an application, and the like, and the modem processor mainly processes wireless communication. It may be understood that the above modem processor may alternatively not be integrated into the processor 1010.

The mobile terminal 1000 may also include a power supply 1011 (such as a battery) that supplies power to various components. Optionally, the power supply 1011 may be logically connected with the processor 1010 through a power management system, thereby implementing functions such as charging management, discharging management, and power consumption management through the power management system.

In addition, the mobile terminal 1000 may include other functional modules not shown, as would be understood by one of skill in the art, and details thereof will not be described herein.

Optionally, embodiments of the present disclosure further provide a mobile terminal, including a processor 1010, a memory 1009, a computer program stored in the memory 1009 and capable of being executed by the processor 1010, wherein the processor 1010 is used to execute the computer program to implement various processes of the embodiments of the above-described methods operable by the mobile terminal for monitoring a paging message, and may achieve a same technical effect. In order to avoid repetition, details thereof will not be repeated herein.

Embodiments of the present disclosure further provide a computer-readable storage medium, wherein a computer program is stored in the computer-readable storage medium, and the computer program is used to be executed by a processor to implement various processes of the embodiments of the above-described methods operable by the mobile terminal for monitoring a paging message, and may achieve a same technical effect. In order to avoid repetition, details thereof will not be repeated herein. The computer-readable storage medium may be, for example, a read-only memory (Read-Only Memory, ROM), a random-access memory (Random-Access Memory, RAM), a magnetic disk, an optical disk, or the like.

Figure 11:
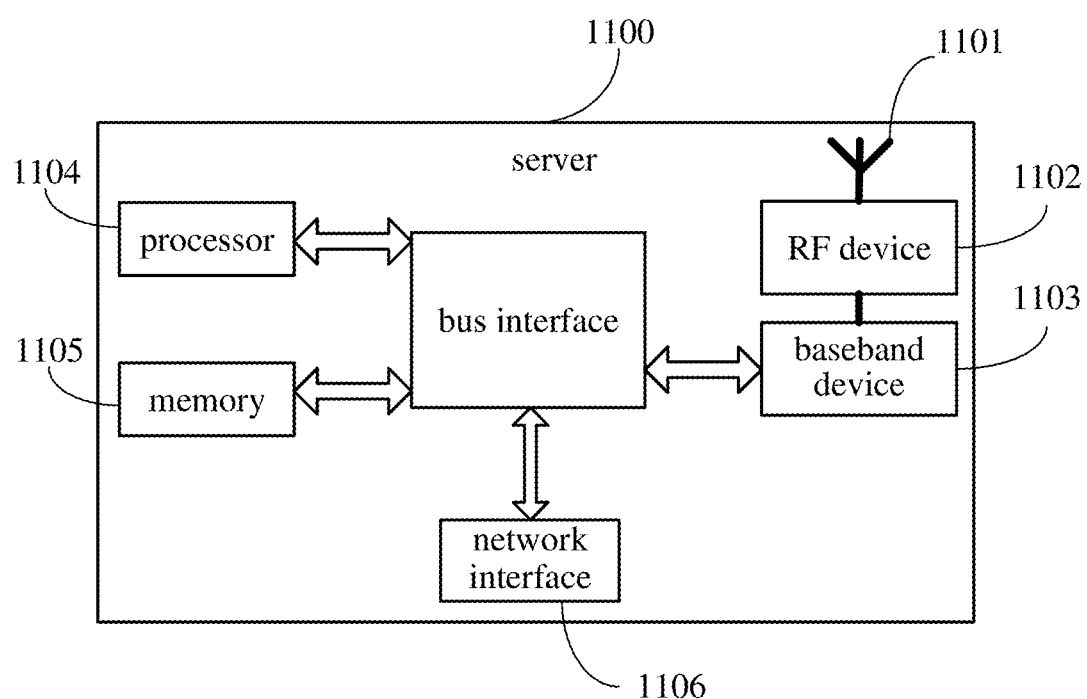
FIG. 11 shows a third block diagram of a server provided by an embodiment of the present disclosure.

According to another aspect of the embodiments of the present disclosure, a server is provided. In an embodiment as shown in FIG. 11, the server 1100 includes an antenna 1101, an RF device 1102, and a baseband device 1103. The antenna 1101 is connected with the RF device 1102. In an uplink direction, the RF device 1102 receives information through the antenna 1101, and transmits the received information to the baseband device 1103 for processing. In a downlink direction, the baseband device 1103 processes the information to be transmitted and transmits it to the RF device 1102, and the RF device 1102 processes the received information and transmits it out through the antenna 1101.

The above frequency band processing device may be located in the baseband device 1103, the method executed by the server in the above embodiments may be implemented in the baseband device 1103, and the baseband device 1103 may include a processor 1104 and a memory 1105.

The baseband device 1103 may include, for example, at least one baseband board, and a plurality of chips arranged on the baseband board, as shown in FIG. 11; one of the chips, e.g., the processor 1104, is connected with the memory 1105 to call programs in the memory 1105 to execute server operations described in connection with the above method embodiments.

In some embodiments, the baseband device 1103 may further include a network interface 1106 for exchanging information with the RF device 1102, and the network interface 1106 may be, for example, a Common Public Radio Interface (CPRI).

The processor herein may refer to a single processor, or multiple processing elements. For example, the processor may be a Central Processing Unit (CPU) or an Application Specific Integrated Circuit (ASIC), or may be one or more integrated circuits used to implement the methods executed by the above server, e.g., one or more microprocessors, or one or more Digital Signal Processors (DSPs), or one or more Field Programmable Gate Array (FPGAs), etc. A storage element may refer to a single memory or multiple storage elements.

The memory 1105 may be a volatile memory or a non-volatile memory, or may include both the volatile memory and the non-volatile memory. The non-volatile memory may be a read only memory (Read Only Memory, ROM), a programmable read only memory (Programmable ROM, PROM), an erasable programmable read only memory (Erasable PROM, EPROM), an electrically erasable programmable read only memory (Electrically EPROM, EEPROM) or a flash memory. The volatile memory may be a random access memory (Random Access Memory, RAM) that acts as an external cache. By way of example but not restrictive description, many forms of RAMs may be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM) and a direct Rambus random access memory (Direct Rambus RAM, DRRAM). The memory 1105 described in this application is intended to include, but not be limited to, these and any other suitable types of memories.

Specifically, in an embodiment, the processor 1104 may be used to: receive the identity information of the mobile terminal reported by the mobile terminal, and the location information of the wireless access device in the connected state where the wireless access device is connected with the mobile terminal; and transmit the first message to the mobile terminal according to the identity information of the mobile terminal and the location information of the wireless access device.

In embodiments the wireless access device may have access to the Internet. The first message includes information about the first paging cycle according to which a paging message is monitored when the mobile terminal is in the connected state where the mobile terminal is connected with the wireless access device.

The first paging cycle is longer than the second paging cycle, and the second paging cycle is equal to a cycle according to which the core network transmits a paging message, and the cycle according to which a core network transmits the paging message is the paging cycle specified in a mobile communication standard.

The server may be a base transceiver station (Base Transceiver Station, BTS) in a global system of mobile communication (Global System of Mobile communication, GSM) or code division multiple access (Code Division Multiple Access, CDMA), or may be a NodeB (NB) in wideband code division multiple access (Wideband Code Division Multiple Access, WCDMA), or may be an Evolutional Node B (eNB or eNodeB) in long term evolution (Long Term Evolution, LTE), or a relay station or an access point, or a base station in a future fifth Generation (5G) network, etc., which is not limited herein.

In embodiments of the present disclosure, a new paging protocol is defined in a mobile communication system. When a mobile terminal is in a connected state where the mobile terminal is connected with a wireless access device that has access to the Internet, a paging cycle according to which the mobile terminal monitors a paging message can be modified, so that the paging cycle of monitoring the paging message can be extended, so as to save power consumption and extend battery life of the mobile terminal.

Optionally, embodiments of the present disclosure further provide a server, including a processor 1104, a memory 1105, and a computer program stored in the memory 1105 and capable of being executed by the processor 1104, and the computer program is used to be executed by the processor 1104 to implement various processes of embodiments of a method operable in the core network for monitoring a paging message, and may achieve a same technical effect. In order to avoid repetition, details thereof will not be repeated herein.

Embodiments of the present disclosure further provide a computer-readable storage medium, wherein a computer program is stored in the computer-readable storage medium, and the computer program is used to be executed by a processor to implement various processes of embodiments of a method operable in a core network for monitoring a paging message, and may achieve a same technical effect. In order to avoid repetition, details thereof will not be repeated herein. The computer-readable storage medium may be, for example, a read-only memory (Read-Only Memory, ROM), a random-access memory (Random-Access Memory, RAM), a magnetic disk or an optical disk.

It should be noted that, in the present disclosure, the terms "including", "comprising" or any other variants thereof are intended to cover a non-exclusive inclusion, so that a process, method, article or device that includes a series of elements includes not only those elements, but also other elements that are not explicitly listed, or includes elements inherent to such process, method, article, or device. Without more restrictions, an element defined by a statement "include a . . . " does not exclude that there are other elements or other identical elements in a process, method, article or device that includes the element.

Through the description of the above embodiments, one of skill may clearly understand that the methods in the above embodiments may be implemented by means of software plus a necessary general hardware platform. Naturally, the methods in the above embodiments may alternatively be implemented by means of hardware. However, in many but not all cases, the former is a better implementation. Based on such understanding, the technical solution of the present disclosure may be embodied in a form of a software product in essence, or a part of the technical solution of the present disclosure may be embodied in the form of the software product, and the computer software product may be stored in a storage medium (such as ROM/RAM, magnetic disk, optical disk), and include instructions to enable a terminal (which may be a mobile phone, a computer, a server, an air conditioner, a network device, or the like) to execute the methods described in various embodiments of the present disclosure.

The embodiments of the present disclosure are described above in combination with the accompanying drawings, but the present disclosure is not limited to the above specific implementations. The above specific implementations are only descriptive rather than being restrictive. Under the teaching of the present disclosure, one of skill may make many modifications without departing from the principles of the present disclosure.

What is claimed is:

1. A method, operable by a mobile terminal, for monitoring a paging message, comprising:
   detecting whether the mobile terminal is in a first connected state where the mobile terminal is connected with a wireless access device accessing the Internet, wherein the wireless access device is configured to enable the mobile terminal to access the Internet through a Wireless Local Area Network (WLAN);

as long as the mobile terminal is in the first connected state where the mobile terminal is connected with the wireless access device, keeping monitoring, through the wireless access device, the paging message according to only a first paging cycle, and not monitoring, through the base station, the paging message;

only when the mobile terminal detects that the mobile terminal is disconnected from the wireless access device and that the mobile terminal is in a second connected state where the mobile terminal is connected with a base station, monitoring, through the base station, the paging message according to only a second paging cycle, wherein both the first paging cycle and the second paging cycle are used to receive the paging message from a core network of a Long Term Evolution (LTE) system, or both the first paging cycle and the second paging cycle are used to receive the paging message from a core network of a New Radio (NR) system; and the first paging cycle is longer than the second paging cycle, and the second paging cycle is equal to a cycle according to which the core network transmits the paging message through the base station.

2. The method according to claim 1, wherein after detecting that the mobile terminal has been in the first connected state where the mobile terminal is connected with the wireless access device, and before monitoring the paging message according to the first paging cycle, the method further comprises:

acquiring identity information of the mobile terminal and location information of the wireless access device;

reporting the identity information of the mobile terminal and the location information of the wireless access device to the core network.

3. The method according to claim 2, wherein the identity information comprises: a Media Access Control (MAC) address of the mobile terminal, an Internet Protocol (IP) address assigned to the mobile terminal by the wireless access device, an International Mobile Equipment Identity (IMEI) code of the mobile terminal and a Temporary Mobile Subscriber Identity (TMSI) code of the mobile terminal.

4. The method according to claim 2, wherein after the step of reporting the identity information of the mobile terminal and the location information of the wireless access device to the core network, the method further comprises:

receiving a first message transmitted by the core network, wherein the first message comprises information about the first paging cycle according to which the paging message is monitored when the mobile terminal is in the first connected state where the mobile terminal is connected with the wireless access device.

5. The method according to claim 1, wherein after monitoring the paging message according to the first paging cycle, the method further comprises:

receiving the paging message transmitted by the core network through the wireless access device.

6. The method according to claim 1, wherein after the step of monitoring the paging message according to the first paging cycle when the mobile terminal is in the first connected state where the mobile terminal is connected with the wireless access device, the method further comprises:

upon detecting that the mobile terminal is disconnected from the wireless access device, transmitting a second message to the core network, wherein the second message comprises information that the mobile terminal is in a disconnected state where the mobile terminal is disconnected from the wireless access device.

7. A mobile terminal, comprising a processor, a memory, and a computer program stored in the memory and capable of being executed by the processor, wherein the processor is used to execute the computer program to implement steps of a method for monitoring paging message, comprising:

detecting whether the mobile terminal is in a first connected state where the mobile terminal is connected with a wireless access device accessing the Internet, wherein the wireless access device is configured to enable the mobile terminal to access the Internet through a Wireless Local Area Network (WLAN);

as long as the mobile terminal is in the first connected state where the mobile terminal is connected with the wireless access device, keeping monitoring, through the wireless access device, the paging message according to only a first paging cycle, and not monitoring, through the base station, the paging message;

only when the mobile terminal detects that the mobile terminal is disconnected from the wireless access device and that the mobile terminal is in a second connected state where the mobile terminal is connected with a base station, monitoring, through the base station, the paging message according to only a second paging cycle, wherein both the first paging cycle and the second paging cycle are used to receive the paging message from a core network of a Long Term Evolution (LTE) system, or both the first paging cycle and the second paging cycle are used to receive the paging message from a core network of a New Radio (NR) system; and the first paging cycle is longer than the second paging cycle, and the second paging cycle is equal to a cycle according to which the core network transmits the paging message through the base station.

8. The mobile terminal according to claim 7, wherein the processor is further used to execute the computer program to: after detecting that the mobile terminal has been in the first connected state where the mobile terminal is connected with the wireless access device, and before monitoring the paging message according to the first paging cycle, acquire identity information of the mobile terminal and location information of the wireless access device;

report the identity information of the mobile terminal and the location information of the wireless access device to the core network.

9. The mobile terminal according to claim 8, wherein the identity information comprises: a Media Access Control (MAC) address of the mobile terminal, an Internet Protocol (IP) address assigned to the mobile terminal by the wireless access device, an International Mobile Equipment Identity (IMEI) code of the mobile terminal and a Temporary Mobile Subscriber Identity (TMSI) code of the mobile terminal.

10. The mobile terminal according to claim 8, wherein the processor is further used to execute the computer program to: after reporting the identity information of the mobile terminal and the location information of the wireless access device to the core network, receive a first message transmitted by the core network, wherein the first message comprises information about the first paging cycle according to which the paging message is monitored when the mobile terminal is in the first connected state where the mobile terminal is connected with the wireless access device.

11. The mobile terminal according to claim 7, wherein the processor is further used to execute the computer program to: after monitoring the paging message according to the first paging cycle,
    receive the paging message transmitted by the core network through the wireless access device.

12. The mobile terminal according to claim 7, wherein the processor is further used to execute the computer program to: after monitoring the paging message according to the first paging cycle when the mobile terminal is in the first connected state where the mobile terminal is connected with the wireless access device,
    upon detecting that the mobile terminal is disconnected from the wireless access device, transmit a second message to the core network,
    wherein the second message comprises information that the mobile terminal is in a disconnected state where the mobile terminal is disconnected from the wireless access device.

\* \* \* \* \*